United States Patent [19]

Sorkin

[11] 3,941,202

[45] Mar. 2, 1976

[54] DIGITAL SPEED CONTROL

[75] Inventor: Morris Sorkin, Santa Monica, Calif.

[73] Assignee: TRW Inc., Redondo Beach, Calif.

[22] Filed: Apr. 30, 1970

[21] Appl. No.: 33,186

[52] U.S. Cl. ............. 180/105 E; 123/102; 104/152; 317/5; 340/172.5
[51] Int. Cl. ..................... B60k 31/00; G05d 13/00
[58] Field of Search .......... 180/105, 106, 107, 108, 180/109; 123/102; 318/314, 600, 601; 340/268; 104/152; 317/5

[56] References Cited
UNITED STATES PATENTS

| | | | |
|---|---|---|---|
| 3,237,313 | 3/1966 | Gevas | 318/601 X |
| 3,349,308 | 10/1967 | Strand | 318/314 |
| 3,365,634 | 1/1968 | Centner et al. | 318/600 |
| 3,424,966 | 1/1969 | Webb | 318/314 |
| 3,448,360 | 6/1969 | Pohl | 318/601 |
| 3,455,411 | 7/1969 | Carp et al. | 180/105 |
| 3,485,316 | 12/1969 | Slavin et al. | 180/105 |
| 3,500,375 | 3/1970 | Klimo | 340/268 |
| 3,511,329 | 5/1970 | Wisner | 180/105 |
| 3,564,368 | 2/1971 | Kelling | 318/314 |
| 3,599,154 | 8/1971 | Carol, Jr. et al. | 180/105 E X |

*Primary Examiner*—David Schonberg
*Assistant Examiner*—John P. Silverstrim
*Attorney, Agent, or Firm*—Daniel T. Anderson; Edwin A. Oser; Jerry A. Dinardo

[57] ABSTRACT

The present invention relates to a digital system for maintaining the speed of a motor vehicle at a preselected speed. The desired speed of the vehicle is set into a digital memory bank and the instantaneous actual speed of the vehicle is determined by a digital readout. The desired vehicle speed and the actual speed of the vehicle are compared to produce a digital error signal which is used to control the throttle setting of the vehicle to cause the actual speed of the vehicle to equal the desired speed.

10 Claims, 4 Drawing Figures

DIGITAL SPEED CONTROL

CROSS-REFERENCES TO RELATED APPLICATIONS

The present application is an improvement upon a copending patent application entitled Digital Speed Control by Jeffrey A. Oicles which is assigned to the same assignee as the present invention and was forwarded for filing in the Patent Office on or about Jan. 6, 1970.

BACKGROUND OF THE INVENTION

Automatic speed control devices are highly advantageous in driving great distances on limited access highways to help the driver maintain a desired speed for a long period of time.

The earliest automatic speed control was an elementary dashboard throttle control positioned to hold the throttle at a fixed setting. This type of control, however, was unable to compensate for the various changes in driving conditions, such as wind, terrain, and road surface characteristics.

Electronic automobile speed controls have been developed using two analog electrical signals, one proportional to the actual speed of the vehicle and the other proportional to the desired vehicle speed. These analog signals are compared to generate an error signal which is applied to position the throttle to make the actual speed of the vehicle equal to the desired speed.

Further improvements to these prior art devices have been disclosed which utilize analog memory systems for recording the deisred vehicle speed. A typical analog memory comprises a high quality capacitor which is charged to a preselected voltage. The voltage stored by the capacitor is proportional to the desired speed. A very high input impedance amplifier is used to read out the preselected voltage and compare it to the voltage representative of the actual speed of the vehicle. The high quality capacitors must be able to maintain their charge within one percent for five hours. To accomplish this, the capacitors must be of an expensive variety and be hermetically sealed to prevent leakage. The high cost of these capacitors is therefore highly disadvantageous.

Another example of an analog memory is disclosed in U.S. Pat. No. 3,340,950 by Albert Hopengarten. Hopengarten discloses an analog memory for speed control wherein a tone having a frequency proportional to the actual speed of the vehicle is generated. When the desired speed is reached, the tone produced at that speed is recorded on a magnetic tape. Means are provided for controlling the speed of the vehicle in response to the recorded signal.

Analog memories such as those described above are expensive in comparison to a digital memory. However, using the digital memory in an analog system would require analog—to—digital converters which would destroy the inherent economy of a digital memory.

It would be desirable, therefore, to construct an all digital speed maintaining system to take full advantage of the economy of a digital memory. In addition, the emerging technology of metal oxide semiconductor large scale integration (MOS LSI) circuits makes the digital approach economically attractive for programs involving large quantities, such as automobile production. Furthermore, the nature of digital electronics results in a speed control that is largely unaffected by temperature variations, power supply noise, aging and production tolerances.

SUMMARY

In accordance with an example of a preferred embodiment of the present invention, the speed of a motor vehicle is sensed by a digital sensor to produce digital speed pulses. A reference clock generates a series of reference clock pulses. A digital counter counts and stores the number of digital speed pulses occurring in one period of the reference clock, thus producing a digital number proportional to the desired speed of the vehicle.

The number of speed pulses occurring in one reference clock period is digitally compared to the stored number of speed pulses to produce a digital error signal. The speed of the vehicle is controlled by an electromechanical throttle valve solenoid. In response to the digital error signal, the throttle valve solenoid adjusts the speed of the vehicle to be the desired speed.

DESCRIPTION OF THE PREFERRED EMBODIMENTS

Figure 1:
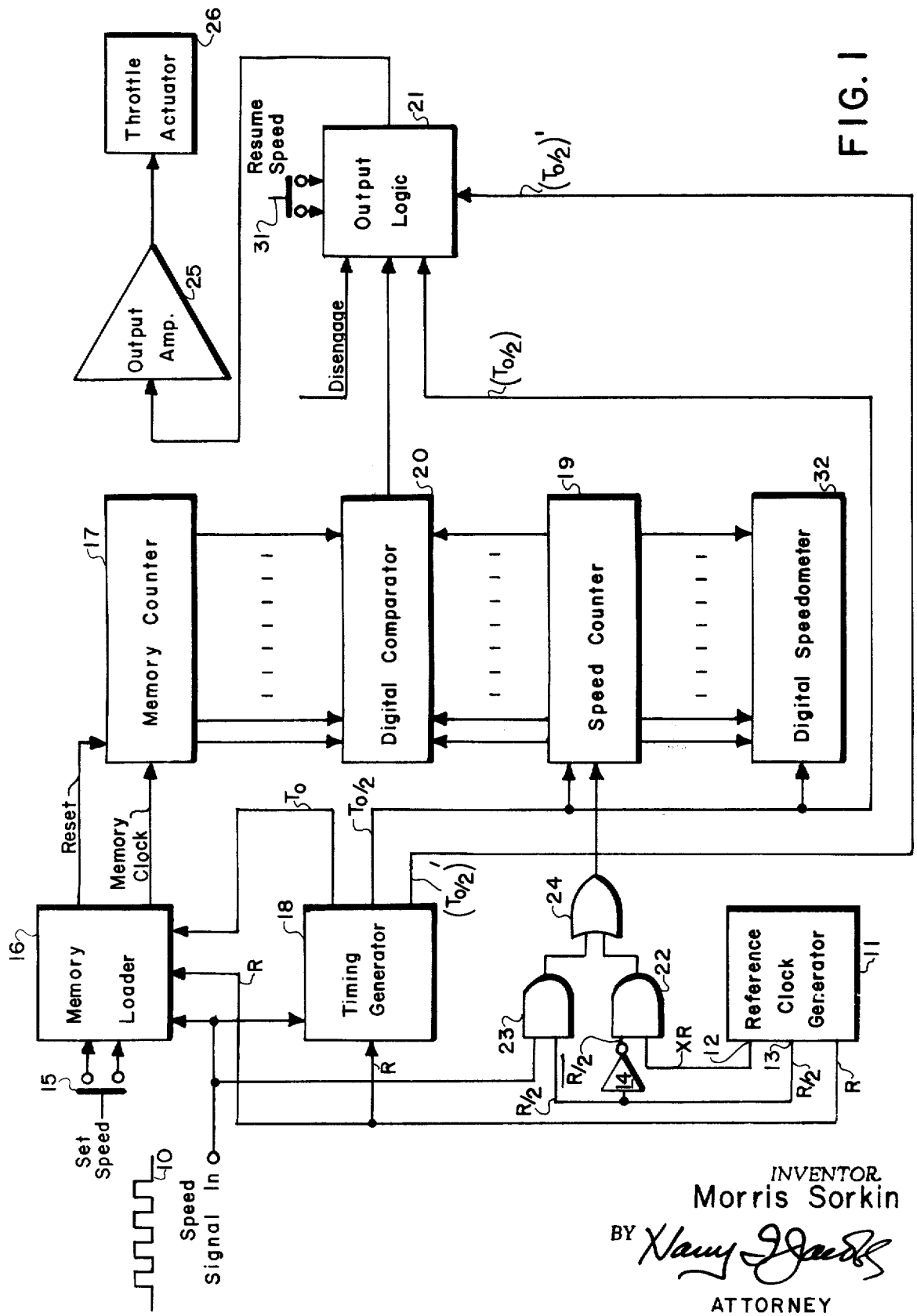
FIG. 1 is a block diagram of an example of a preferred embodiment of a digital speed control according to the invention.

In the digital speed control shown in FIG. 1, a speed signal 10 is received from the vehicle at the "speed signal in" terminal. The speed signal is in the form of a series of pulses as illustrated in FIG. 2A. As the speed of the vehicle increases, the number of pulses per unit of time increases proportionately. Thus, speed signal 10 represents the actual speed of the vehicle at any instant of time.

The speed signal 10 may be derived in any of the number of ways known for generating a series of pulses responsive to the speed of a moving vehicle. For example, speed signal 10 may be generated by a rotating gear operatively connected to the drive train rotating at a speed proportional to the speed of the vehicle and inducing impulses into a detector as each gear tooth passes by the detector. The number of pulses produced per unit of time is proportional to the speed of the vehicle. In other words, the frequency of the speed signal is proportional to the speed of the vehicle.

A reference clock 11 produces three series of pulse trains, two of which are shown in FIGS. 2B and 2C. Reference clock 11 produces the three pulse trains as follows. A digital clock produces pulse train XR at output 12 of reference clock 11. Pulse train XR has a frequency which is low compared to the speed signal 10 at normal driving speeds. Binary dividers within reference clock 11 divide the frequency of pulse train XR to produce a pulse train R shown in FIG. 2B. The frequency of reference clock pulse train R is much lower than the frequency of speed signal 10 shown in FIG. 2A. It is within the scope of the invention, however, to provide reference clock pulse train R timing having a much higher frequency than the speed signal. Choice of timing schemes may be dictated by digital equipment limitations and not theory. Therefore, for purposes of the following discussion, reference will be made only to a timing scheme employing a reference clock pulse train R that is lower than the frequency of the speed signal.

Reference clock pulse train R is further divided by two, within reference clock 11, to produce a pulse train R/2 at output 13. Reference clock pulse train R/2 is shown in FIG. 2C. An inverter 14 operates upon R/2 to produce the wave form shown in FIG. 2D. The inverted R/2 wave form will hereinafter be referred to as $\overline{R/2}$.

To engage the digital speed control, the vehicle operator adjusts the speed of the vehicle to the desired value and activates a set speed switch 15. Activating switch 15 triggers a memory loader 16 which causes a memory counter 17 to count and store the number of speed signal pulses for one R period of the reference clock shown in FIG. 2B. Thus, the number of speed signal pulses stored in any R clock period is a binary digital number proportional to the speed of the vehicle during that R clock period. The desired speed of the vehicle, which is proportional to the number of speed signal pulses stored in memory counter 17, is hereinafter referred to as the "set speed."

Figure 2:
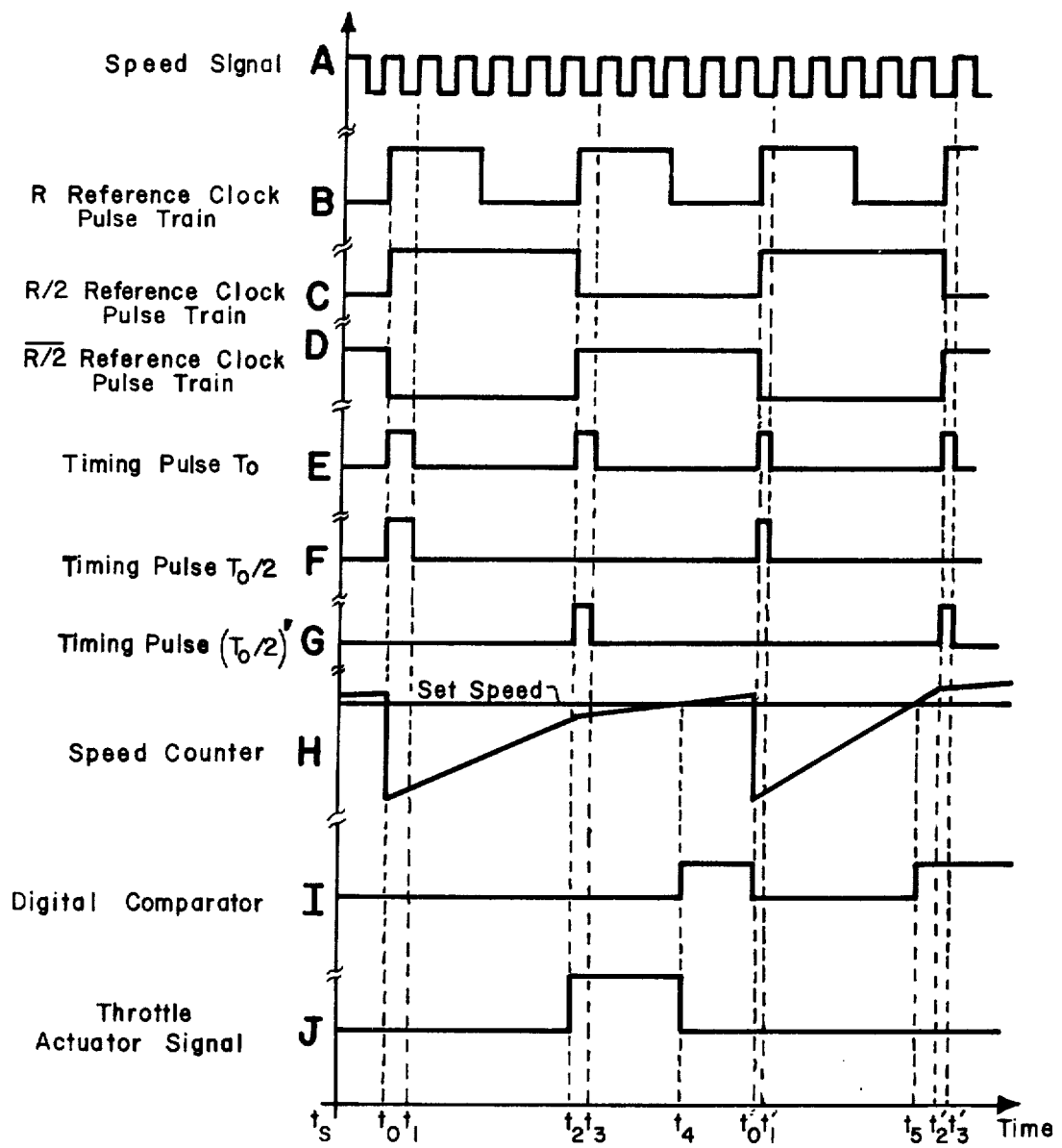
FIG. 2 is a system timing diagram displaying wave forms of the various system components.

To understand more fully how memory loader 16 and memory counter 17 operate, reference is made to a timing generator 18. Timing generator 18 receives speed signal pulses 10 and the R output of reference clock 11. Timing generator 18 produces output pulses $T_o$, $T_o/2$ and $(T_o/2)'$ shown in FIGS. 2E, 2F and 2G respectively. As shown in FIG. 2, timing pulse $T_o$ rises to a preselected potential at the initiation of the first R reference clock pulse occurring at time $t_o$. At the initiation of the next speed signal timing pulse, occurring at time $t_1$, timing pulse $T_o$ returns to zero. At the initiation of the next R reference clock pulse, occurring at time $t_2$, timing pulse $T_o$ again rises to the preselected potential and falls to zero at time $t_3$, which time is coincident with the initiation of the next speed signal pulse. Similarly, timing pulse $T_o$ rises up at time $t_o'$ and falls at $t_1'$, rises up at time $t_2'$ and falls at time $t_3'$.

Timing generator 18 uses timing pulse $T_o$ to make timing pulses $T_o/2$ and $(T_o/2)'$. Timing pulse $T_o$ is derived from every odd numbered $T_o$ timing pulse. Thus $T_o/2$ timing pulses coincide with the beginning of each R/2 clock period. Timing pulse $(T_o/2)'$ is derived from every even numbered $T_o$ timing pulse. Thus $T_o/2$ timing pulses coincide with the beginning of each $\overline{R/2}$ clock period. It is within the scope of the invention to derive the $T_o/2$ and $(T_o/2)'$ timing pulses from the R/2 and $\overline{R/2}$ clock pulses respectively.

Memory loader 16 receives speed signal pulses 10, R reference clock pulses, and a $T_o$ timing pulse. When set speed switch 15 is activated, memory loader 16 is enabled to operate at the beginning of the next R clock period. Referring to FIG. 2, assume that set speed switch 15 is activated at time $t_s$. The next R clock period will begin at time $t_o$. At time $t_o$, a $T_o$ timing pulse resets memory counter 17 via the reset line and speed signal 10 is directed by memory loader 16 via the memory clock line to memory counter 17. Memory counter 17 is a digital counter clocked by speed signal 10, which counts for one R clock period. At time $t_o'$, memory counter 17 ceases counting and memory loader 16 completes its function until set speed button 15 is depressed to enter a new set speed.

Since memory counter 17 has counted the number of speed signal pulses in a known period of time, i.e., one R clock period, the digital number stored therein is proportional to the set speed of the vehicle during that R clock period which immediately follows activation of set speed switch 15.

A speed counter, 19, which is a digital counter, is clocked by either speed signal 10 or the XR output of reference clock 11, and is reset to zero by a $T_o/2$ timing pulse.

A digital comparator, 20, receives inputs from memory counter 17, and speed counter 19. When the outputs of memory counter 17 and speed counter 19 coincide, digital comparator 20 outputs a pulse to an output logic 21. The operation of output logic 21 will be explained in detail later.

Speed counter 19 is clocked as follows. The XR pulse train and $\overline{R/2}$ are fed to a first AND gate 22. Speed signal 10 and R/2 are fed to a second AND gate 23. The outputs of first and second AND gates 22 and 23 are fed to an OR gate 24. The output of OR gate 24 is used to clock speed counter 19. Referring to FIG. 2, from time $t_o$ until time $t_2$, R/2 will be high and $\overline{R/2}$ will be low. Thus, AND gate 23 will be enabled and AND gate 22 will be disabled, therefore speed signal 10 will clock speed counter 19 via AND gate 23 and OR gate 24. From time $t_2$ until time $t_o'$, R/2 will be low and $\overline{R/2}$ will be high. Thus AND gate 23 will be disabled and AND gate 22 will be enabled, therefore the XR output of reference clock 11 will clock speed counter 19 via AND gate 22 and OR gate 24.

FIG. 2H shows the output of speed counter 19. The line labeled "set speed" represents a count corresponding to the output of memory counter 17. If the "set speed" line were higher, the set speed of the vehicle would be higher. Conversely, if the "set speed" line were lower, the set speed of the vehicle would be lower. At time $t_o$, $t_o'$, etc., timing pulse $T_o/2$ resets speed counter 19 and digital comparator 20 follows to zero in response to speed counter 19. From time $t_o$ until time $t_2$ speed counter 19 is clocked by speed signal 10. From time $t_2$ until time $t_o'$ speed counter 19 is clocked by the XR output of reference clock 11. At a time $t_4$, the output of speed counter 19 equals that of memory counter 17 causing digital comparator 20 to output a pulse as shown in FIG. 2I. The output of comparator 20 remains high, and speed counter 19 continues to count until time $t_o'$, when they are reset to zero in response to a $T_o/2$ timing pulse.

Output logic 21 controls the speed of the vehicle as follows. Output logic 21 receives timing pulses $T_o/2$ and $(T_o/2)'$ from timing generator 18, and the output of digital comparator 20. The output of logic 21 is amplified by an output amplifier 25 which in turn drives a throttle actuator 26. Throttle actuator 26 directly controls the speed of the vehicle.

Figure 3:
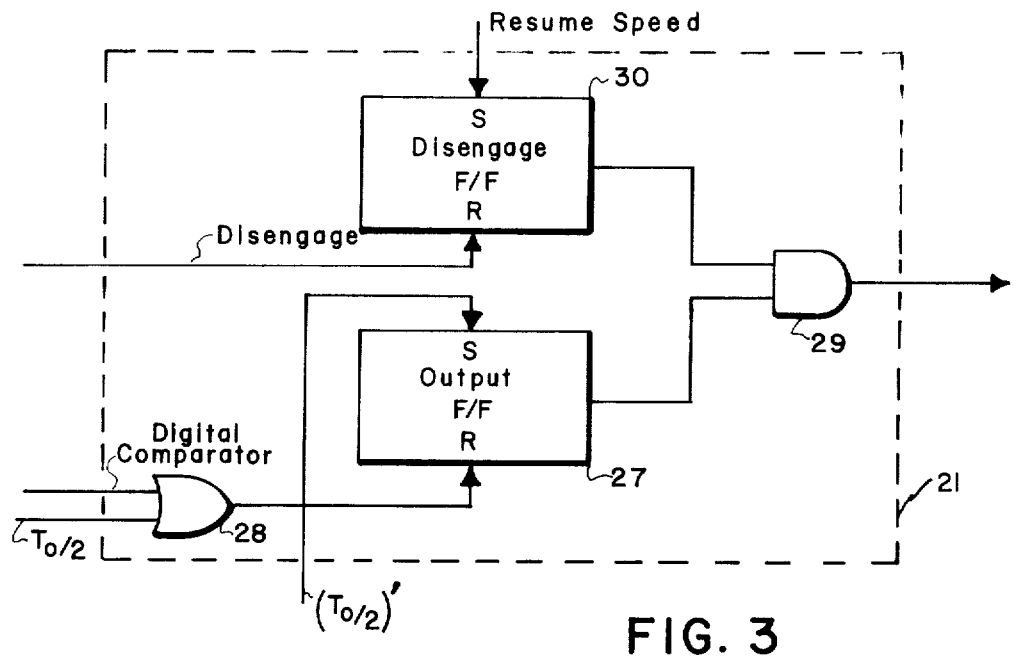
FIG. 3 is a logic diagram of the output logic shown in FIG. 1.

The operation of output logic 21 can be explained with reference to the logic diagram of FIG. 3. An output flip-flop 27 is set upon receipt of a $(T_o/2)'$ pulse and reset via an OR gate 28 upon receipt of a pulse from digital comparator 20 or a $T_o/2$ pulse from timing generator 18. The output of output flip-flop 27 is fed to output amplifier 25 via a third AND gate 29.

The system may be disengaged or engaged by means of a disengage flip-flop 30. It should be remembered that output flip-flop 27 is gated to drive throttle actuator 26 by a third AND gate 29. Third AND gate 29 is enabled and disabled by the output of disengage flip-flop 30. When the disengage flip-flop is set, the logical one output enables AND gate 29. Thus the output from flip-flop 27 is able to drive throttle actuator 26. When the disengage flip-flop is reset, the logical zero output disables AND gate 29 to cut off the output of flip-flop 27 from throttle actuator 26. A disengage pulse to reset flip-flop 30 may be generated by applying the brakes of the vehicle, or by moving the transmission to a neutral position. To re-engage the system, a resume speed switch 31 is activated to generate a pulse to set flip-flop 30 to enable third AND gate 29 to gate the output of flip-flop 27 to throttle actuator 26.

The generation of the throttle actuator signal may be explained with reference to FIGS. 2 and 3. A $(T_o/2)'$ pulse occurring at time $t_2$ sets output flip-flop 27. When speed counter 19 counts up to the set speed, the output of digital comparator 20 resets flip-flop 27 at time $t_4$. Digital comparator 20 is reset in response to a $T_o/2$ pulse at time $t_o'$. If the actual speed of the vehicle is less than the set speed, the comparator will output a pulse after time $t_2$.

The length of time from time $t_o$ until $t_4$ is proportional to the difference in speed between the set speed and the actual speed of the vehicle. To produce a square wave having a pulse width proportional to this difference in speed, output flip-flop 27 is set by a $T_o/2$ pulse at time $t_2$, and reset by the digital comparator at time $t_4$.

If the actual speed of the vehicle is much lower than the set speed, speed counter 19 may never count up to the set speed prior to the beginning of the next R/2 clock period. To insure that output flip-flop 27 will be reset in time for the next $(T_o/2)'$ timing pulse, a $T_o/2$ timing pulse resets flip-flop 27 at times $t_o$, $t_o'$, etc. Therefore, the maximum duty cycle of output logic 21 is 50 percent.

If the actual speed of the vehicle is equal to the set speed, speed counter 19 will count up to the set speed at time $t_2$. When this occurs the throttle actuator signal will be inhibited and no throttle will be applied. This condition will produce a zero voltage command to throttle actuator 26.

If the actual vehicle speed is greater than the set speed, speed counter 19 will count up to the set speed at a time $t_5$, prior to time $t_2'$. The output of digital comparator 20 will occur at time $t_5$ and will inhibit output flip-flop 26 from being set at time $t_2'$ by timing pulse $(T_o/2)'$. Thus no throttle will be applied and the vehicle will slow down to the set speed.

The output of logic 21 is therefore a pulse width modulated square wave having a pulse width proportional to the difference in speed between the set speed and the actual speed of the vehicle, so long as the actual speed of the vehicle is less than the set speed. If the actual speed of the vehicle is greater than the set speed, no throttle will be applied until the speed of the vehicle falls to just below the set speed.

Throttle actuator 26 directly controls the throttle, and thus the speed of the vehicle. Throttle actuator 26 may be an electro-pneumatic device responsive to a pulse width modulated signal. Typically, actuator 26 overrides the normal throttle control of the vehicle when the digital speed control is engaged. When the system is engaged, if no voltage is applied to actuator 26, zero throttle is applied to the vehicle. As the pulse width of the input voltage to actuator 26 increases, the average voltage increases proportionately, and the speed of the vehicle increases, as shown in FIG. 4.

Figure 4:
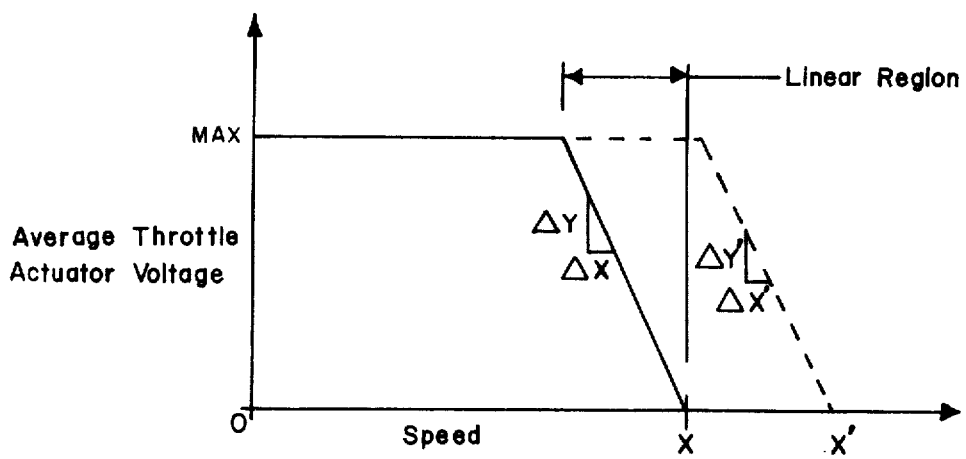
FIG. 4 is a plot of the average throttle actuator voltage versus the actual speed of the vehicle.

Referring to FIG. 4, if the speed of the vehicle is equal to or greater than the set speed "X," the output of digital comparator 20 will inhibit the throttle actuator signal so that it will be flat, thus yielding a zero throttle actuator voltage. The zero throttle actuator voltage produces a zero throttle which causes the vehicle to slow down until it reaches the set speed.

At speeds below set speed "X," the average throttle actuator voltage increases linearly until it reaches maximum value. The maximum value occurs when the actual speed of the vehicle is so far below the set speed that speed counter 19 will not count up to the set speed during one R/2 clock period. When this occurs, the throttle actuator signal will rise up at time $t_2$ and remain high until a $T_o/2$ timing pulse resets output flip-flop 27. Thus, a 50 percent duty cycle is produced at the output of logic 21 to cause throttle actuator 26 to apply maximum throttle to bring the actual speed of the vehicle up to the set speed.

The maximum value of the average throttle actuator voltage is proportional to the maximum value of output amplifier 25. By adjusting the gain of amplifier 25, the maximum average throttle actuator voltage can be raised or lowered.

The gain of the speed control error voltage is the slope $\Delta Y/\Delta X$ of the plot of average throttle actuator voltage versus speed shown in FIG. 4. The slope can be adjusted by altering the frequency of the XR output of reference clock 11. If the frequency is decreased, speed counter 19 will take longer to count up to the set speed for a given difference between the set speed and an actual vehicle speed. Since speed counter 19 takes longer to count up to the set speed, the pulse width of the output from logic 21 is increased and the average throttle actuator voltage is increased. Therefore, the slope of the curve shown in FIG. 4 is steepened and the gain of the speed control error voltage is increased. Similarly, if the frequency of the XR output of reference clock 11 is increased, speed counter 19 will count up to the set speed faster for a given difference in speed between the set speed and an actual vehicle speed, and the average throttle actuator voltage will be lower. Therefore, the slope of the curve shown in FIG. 4 is lessened and the gain of the speed control error voltage is decreased.

If a higher set speed, such as "X'" is chosen, the gain of the system $\Delta Y'/\Delta X'$ equals $\Delta Y/\Delta X$ because, as explained above, the average throttle actuator voltage is proportional to the absolute difference in speed between the set speed and the actual vehicle speed, not a percentage difference in speed.

It can therefore be seen that when the actual speed of the vehicle drops below the set speed, the average throttle actuator voltage increases until a maximum voltage is reached producing maximum acceleration. As the speed of the vehicle nears the set speed, the average throttle actuator voltage decreases proportionately, reaching zero at the set speed, to prevent jerky movement of the vehicle. At speeds above the set speed, the average throttle actuator voltage remains at zero.

It is within the scope of the invention to provide means for applying the brakes of the vehicle to slow it down when the vehicle speed rises substantially above the set speed.

The invention further includes a digital speedometer 32. Digital speedometer 32 includes a storage element having decoding and readout means. As shown in FIG. 1, digital speedometer 32 receives the output of speed counter 19 and a $T_o/2$ timing pulse from timing generator 18. Recall that speed counter 19 counts a number proportional to the actual speed of the vehicle during one R/2 clock period. At time $t_n'$, the speed counter has a digital number stored therein proportional to the actual speed of the vehicle, and the $T_0/2$ timing pulse transfers that number to the digital speedometer. Digital speedometer 32 stores that number, decodes it, and displays it by readout means. The operator of the vehicle, therefore, is provided with a virtually instanteous digital readout of the actual speed of the vehicle at all times.

What is claimed is:

1. A digital speed control for maintaining a motor vehicle at a preselected speed comprising:
   means for generating a first digital signal responsive to the actual speed of the vehicle;
   means for producing and storing a first digital number proportional to a preselected vehicle speed;
   means for generating a first digital reference clock pulse train;
   means for generating a second digital reference clock pulse train;
   first digital counter means clocked by said first digital signal responsive to the actual speed of the vehicle for a first portion of the period of said first reference clock pulse train, said first digital counter means being further clocked by said second reference clock pulse train for the remainder of said first reference clock pulse period;
   a digital comparator producing a digital error signal which rises to and remains at a preselected potential whenever the output of said first digital counter equals said first digital number proportional to said selected vehicle speed; and
   means for adjusting the speed of the vehicle in response to said digital error signal to maintain the preselected speed.

2. A digital speed control as claimed in claim 1 wherein the first digital signal responsive to the actual speed of the vehicle comprises a series of speed signal pulses having a pulse repetition frequency proportional to the speed of the vehicle.

3. A digital speed control as claimed in claim 1 wherein said second clock pulse train has a pulse repetition rate twice that of said first clock pulse train.

4. A digital speed control for maintaining a motor vehicle at a preselected speed comprising:
   means for generating a first digital signal responsive to the speed of the vehicle having a pulse repetition frequency proportional to the actual speed of the vehicle;
   means for producing and storing a first digital number proportional to a preselected vehicle speed;
   means for generating a first digital reference clock pulse train;
   means for generating a second digital reference clock pulse train;
   a first digital counter;
   means for clocking said first digital counter by said first digital speed signal for a first portion of the period of said first reference clock pulse train and for clocking said first digital counter by said second reference clock pulse train for the remainder of said first reference clock pulse train;
   a digital comparator producing an output which rises to and remains at a preselected potential whenever the output of said first digital counter equals the first digital number proportional to said preselected vehicle speed;
   means for resetting the output of said digital comparator at the beginning of each first reference clock pulse train period;
   means responsive to the output of said digital comparator producing a digital error signal; and
   means for adjusting the speed of the vehicle in response to said digital error signal to maintain the vehicle at said preselected speed.

5. A digital speed control as claimed in claim 4 wherein:
   said digital error signal is a pulse width modulated square wave having a pulse width proportional to the difference in speed between the preselected speed and an actual vehicle speed lower than said preselected speed.

6. A digital speed control as claimed in claim 5 wherein the means responsive to the output of said digital comparator producing a pulse width modulated digital error signal comprises:
   means for producing a first voltage at times corresponding to the beginning of each first even reference clock pulse train period;
   means for inhibiting said first voltage in response to an output from said digital comparator; and
   means for inhibiting said first voltage at times corresponding to the beginning of each first odd reference clock pulse train period.

7. A digital speed control as claimed in claim 5 wherein the means responsive to the output of said digital comparator producing a pulse width modulated digital error signal comprises:
   a first resettable digital flip-flop having an output;
   means for setting the first flip-flop at times corresponding to the beginning of each first even reference clock pulse train period;
   means for resetting said first flip-flop in response to an output from said digital comparator; and
   means for resetting said first flip-flop at times corresponding to the beginning of each first odd reference clock pulse train period.

8. A digital speed control as claimed in claim 7 and further including:
   a second resettable digital flip-flop;
   a first AND gate,
      one input to said first AND gate being from the output of the first digital flip-flop, and
      the other input to said first AND gate being from the output of said second digital flip-flop;
   means for resetting the second flip-flop in response to a command to disengage said digital speed control; and
   means for setting the second flip-flop to engage said digital speed control.

9. A digital speed control as claimed in claim 8 wherein the command to disengage the system is in response to a braking command.

10. A digital speed control as claimed in claim 9 wherein the means for adjusting the speed of the vehicle in response to said digital error signal comprises positioning a throttle to vary the speed of the motor of said vehicle.

* * * * *